Feb. 17, 1931. F. FAUDI 1,792,686
AIR BRAKE
Filed Feb. 4, 1928
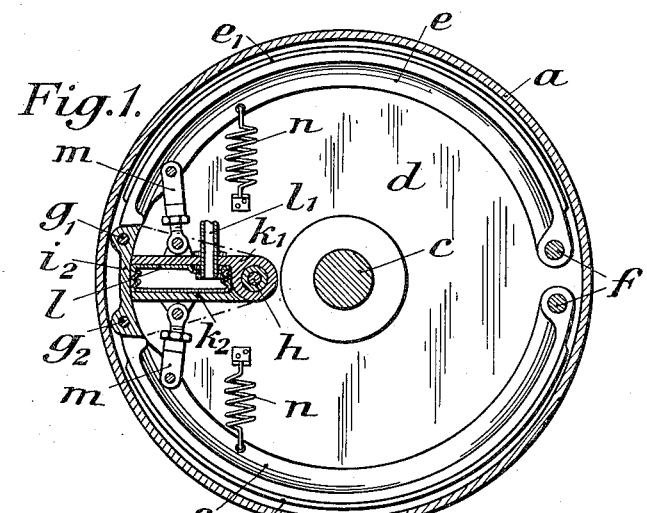
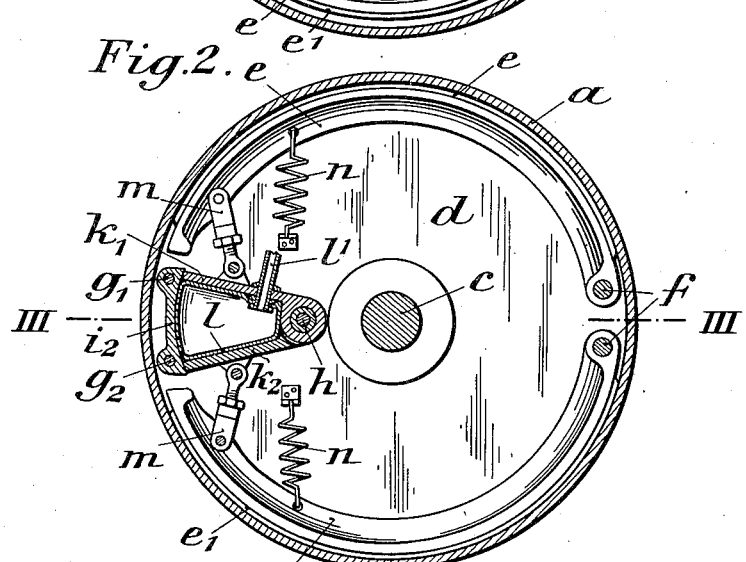
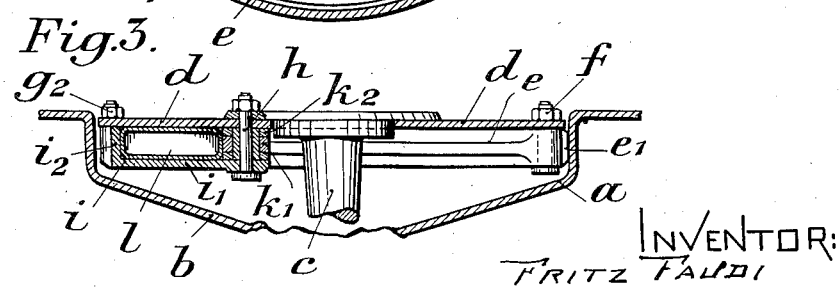
INVENTOR:
FRITZ FAUDI
BY
ATTORNEYS Patented Feb. 17, 1931

1,792,686

UNITED STATES PATENT OFFICE

FRITZ FAUDI, OF SOMMERDA, THURINGIA, GERMANY, ASSIGNOR TO RHEINISCHE METALLWAAREN- UND MASCHINENFABRIK, SOMMERDA AKTIENGESELLSCHAFT, OF SOMMERDA, THURINGIA, GERMANY

AIR BRAKE

Application filed February 4, 1928, Serial No. 251,812, and in Germany February 25, 1927.

My invention relates to air brakes, and particularly to pneumatic brakes suitable for use on the wheels of automobiles. It is an object of the invention to provide a brake of this type which is simple in construction and thoroughly reliable in operation, and is of extremely compact form and of very low weight.

In air brake devices as hitherto constructed, the compressed air acts upon the brake shoes through the intermediary of circular pistons operating in circular cylinders, the pistons being actuated by the compressed air to expand the brake shoes.

In accordance with the present invention, the pistons are constructed in the form of plates which swing about pivots and are of rectangular cross-section, and move in a suitably constructed housing. The compressed air is charged into an air tight and expansible bellows or bag which is disposed in the chamber formed by the housing and the piston plates and is arranged to exert pressure, upon expansion, against such plates to cause the latter to expand the brake shoes which are connected therewith in any suitable manner. Any escape of air is therefore with certainty prevented. The return of the brake shoes may be effected in the usual manner with springs.

In order that my invention may be more easily understood, a preferred embodiment of same is illustrated by way of example in the drawing which accompanies and forms part of this specification, a wheel brake fitted with two inside braking cheeks or shoes and intended to be used in conjunction with automobile wheels being illustrated, the brake casing of the brake being provided with two flap-shaped pistons adapted to rock about a common axis relatively to each other. In this drawing:

Figure 1 is a side view of the brake, partly in section, with the elements of the brake in inoperative position;

Figure 2 is a similar side view showing the brake in operative position, and

Figure 3 is a horizontal cross section through the brake on line III—III of Figure 2.

Referring to the drawing, $a$ denotes the brake drum of a disk wheel $b$, Figure 3, e. g. of an automobile front wheel, which may turn on the axle $c$. A disk $d$ rigid on the axle $c$ defines a hollow space with the drum $a$ and the disk wheel $b$. Within this space two approximately semi-circular brake cheeks or shoes $e$ are mounted for rocking motion on bolts $f$ fixed in the disk $d$.

The disk $d$ has fixed on it by means of bolts $g^1$, $g^2$, $h$, Figure 3, a casing $i$, which comprises a wall $i^1$ extending parallel to the disk $d$ and tapering toward the drum center, and another wall $i^2$ which extends at right angles thereto and the inner face of which is curved concentrically with the axis of the pivot bolt $h$. In the space defined by the three casing walls $i^1$, $i^2$, $d$, are arranged two pressure members or plates $k^1$ and $k^2$ of rectangular form and which fit into this space, the plates being mounted to rock around the bolt $h$, as shown. These plates thus form in connection with the walls $i^1$, $i^2$ of the casing $i$ and with disk $d$ a hollow space or chamber which is closed on all sides and has a variable volume.

A closed air-proof bag $l$ of elastic flexible material, e. g. rubber, is inserted in this hollow space of the casing $d$, $i$, $k^1$, $k^2$, with the plates $k^1$, $k^2$ in outermost position, and abuts on the inner walls of said casing, while it collapses like a bellows when external pressure is applied to it. The bag $l$ is fitted with a tube $l^1$ serving to supply and lead-off compressed air. The tube $l^1$ passes through a bore provided in the upper pressure or piston plate $k^1$ and is connected to a suitable source of compressed air (not shown). Through the intermediary of two links $m$ which are adjustable in length, the piston plates $k^1$, $k^2$ are connected each to one of the brake shoes $e$ near the free ends of the latter.

When the brake is in released position, Figure 1, the free ends of the brake shoes abut on fixed stops, e. g. on the stationary wall $i^2$ of the casing $i$, under the action of springs $n$, $n$ attached to them, so that their braking surfaces $e^1$ are out of contact with the drum $a$ over their entire length. When the brake is in such inoperative position, the plates $k^1$, $k^2$ assume their folded position and house the folded bag $l$.

When the brake is to be applied, compressed air is supplied through tube $l^1$ to the bag $l$, whereby the latter is inflated, the plates $k^1$ $k^2$ are spread apart and the shoes $c$, $c$ are pressed against the inner surface of drum $a$. To release the brake, the compressed air is discharged through the tube $l^1$, so that the shoes $c$, $c$ are lifted from drum $a$ by the pull of the springs $n$, $n$ and the plates $k^1$, $k^2$ return to position of rest.

By designing the packing means of the compressed air casing $d$, $i$, $k^1$, $k^2$ as a completely closed air-proof bag of suitable wall thickness, loss of compressed air is completely avoided. The configuration of the compressed air casing $d$, $i^1$, $i^2$ in conjunction with the movable piston plates $k^1$, $k^2$, as a flat box permits, even with the comparatively small width of the brake drum, piston plates of large total pressure surface and correspondingly high total pressures to be arranged between the brake cheeks without having any mechanism project beyond the drum, since it is the free space between the wheel axle and the periphery of the drum, which is utilized to increase the active piston faces.

Of course, my above-described improved wheel brake may also be arranged in other relations to the brake drum and the wheel than as shown in the illustrated example.

What I claim, is:—

1. In a wheel brake, the combination of a brake drum adapted to partake of the rotation of the wheel, a pair of movable brake shoes co-operating with said drum to arrest rotation of said wheel, a pair of pivoted pressure members connected with said brake shoes and having a common pivot at one end thereof, pneumatically controlled expansible means adapted to oscillate said pressure members on their pivot to apply said brake shoes to said drum, and means for directing the expansion of said pneumatically controlled means against said pressure members.

2. In a wheel brake, the combination of a brake drum adapted to partake of the rotation of the wheel, a pair of movable brake shoes co-operating with said drum to arrest rotation of said wheel, a pair of pivotally movable pressure members connected with said brake shoes and having a common pivot, two spaced parallel fixed walls contiguous to the side edges of said pressure members, a curved fixed wall curved about said common pivot and located adjacent to the ends of said pressure members, an expansible air bag confined between said parallel walls and curved wall and adapted to pivotally operate said pressure members relatively to said walls to apply said brake shoes to said drum, and means for charging air to and discharging the same from said air bag.

3. In a wheel brake, the combination of a brake drum adapted to partake of the rotation of the wheel, a pair of movable brake shoes co-operating with said drum to arrest rotation of said wheel, a fixed disk located concentrically to said drum, an angle member secured to said disk and comprising a straight wall in parallel relation to said disk and a curved wall projecting toward said disk, said disk and angle member together forming a chamber within said drum, pivotally movable pressure members located in said chamber and connected with said brake shoes, an expansible air bag confined within said chamber and adapted upon expansion to pivotally operate said pressure members to apply said brake shoes to said drum, and means for charging air to and discharging the same from said air bag.

4. In a wheel brake, a brake drum adapted to partake of the rotation of the wheel, a stationary disk arranged concentrically to said drum and constituting a closure therefor, stationary members secured to said disk and forming therewith a chamber, two inside brake shoes hinged to said disk and adapted to co-operate with said drum to arrest rotation thereof, two plates pivoted on said disk on a common axis extending parallel to the wheel axle within said drum and movably located in said chamber, a link hinged each to one of said plates and to one of said shoes, an elastic inflatable body closely fitting within said chamber and between said plates and operable upon inflation to oscillate said plates to effect expansion of said shoes, and means for supplying a pressure agent to and leading it off from said inflatable body.

5. In a wheel brake, a brake drum adapted to partake of the rotation of the wheel, a stationary disk arranged concentrically to said drum and constituting a closure therefor, stationary members secured to said disk and forming therewith a chamber, two inside brake shoes hinged to said disk and adapted to co-operate with said drum to arrest rotation thereof, two plates pivoted on said disk on a common axis extending parallel to the wheel axle within said drum and movably located within said chamber, a link hinged each to one of said plates and to one of said shoes, an elastic inflatable body closely fitting within said chamber and between said plates and operable upon inflation to oscillate said plates to effect expansion of said shoes, and means for supplying a pressure agent to and leading it off from said inflatable body, and means for varying the length of said links.

In testimony whereof I have affixed my signature.

FRITZ FAUDI.

CERTIFICATE OF CORRECTION.

Patent No. 1,792,686.             Granted February 17, 1931, to

FRITZ FAUDI.

It is hereby certified that the above numbered patent was erroneously issued to "Rheinische Metallwaaren- Und Maschinenfabrik, Sommerda Aktiengesellschaft", as assignee of the entire interest in said invention, whereas said patent should have been issued to the inventor said Faudi and Rheinische Metallwaaren- Und Maschinenfabrik, Sommerda Aktiengesellschaft, said corporation being assignee of one-half interest only in said invention, as shown by the records of assignments in this office; and that the said Letters Patent should be read with this correction therein that the same may conform to the record of the case in the Patent Office.

Signed and sealed this 10th day of March, A. D. 1931.

(Seal)                                                      M. J. Moore,
                                                           Acting Commissioner of Patents.